(12) United States Patent
Egawa et al.

(10) Patent No.: US 6,286,970 B1
(45) Date of Patent: Sep. 11, 2001

(54) SPREAD ILLUMINATING APPARATUS

(75) Inventors: Motoji Egawa; Shingo Suzuki, both of Shizuoka-ken (JP)

(73) Assignee: Minebea Co., Ltd., Kitasaku-gun (JP)

(*) Notice: Subject to any disclaimer, the term of this patent is extended or adjusted under 35 U.S.C. 154(b) by 0 days.

(21) Appl. No.: 09/340,167

(22) Filed: Jun. 28, 1999

(30) Foreign Application Priority Data

Jun. 29, 1998 (JP) .................................................. 10-182076

(51) Int. Cl.[7] ....................................................... F21V 7/04
(52) U.S. Cl. ........................... 362/31; 362/558; 362/559; 362/556; 362/560
(58) Field of Search ............................. 362/31, 551, 556, 362/558, 560, 562, 516, 559; 313/113, 112; 385/901

(56) References Cited

U.S. PATENT DOCUMENTS

| 3,619,695 | * | 11/1971 | Nameda | 313/112 |
| 4,870,484 |   | 9/1989 | Sonehara . | |
| 5,664,862 | * | 9/1997 | Redmond et al. | 362/31 |
| 5,926,033 | * | 7/1999 | Saigo et al. | 362/31 |

FOREIGN PATENT DOCUMENTS

| 0 725 300 A2 | 8/1996 | (EP) | 40/589 |
| 0 866 264 A1 | 9/1998 | (EP) . | |
| 5-134251 | 5/1993 | (JP) | 174/136 |
| 9-33923 | 2/1997 | (JP) | 279/51 |
| 10-255532 | 9/1998 | (JP) . | |
| 10-260405 | 9/1998 | (JP) . | |

* cited by examiner

Primary Examiner—Sandra O'Shea
Assistant Examiner—Bertrand Zeade
(74) Attorney, Agent, or Firm—Oliff & Berridge, PLC

(57) ABSTRACT

A spread illuminating apparatus 1 according to the present invention includes a transparent substrate, a linear light source made up of a light reflector 16 as an optical path conversion portion and/or a light conductor 13 made of a linear transparent material and having optical path conversion portion at least, on either side and disposed closely along at least one side end surface 3 of a transparent substrate 2, and a dot-shaped light source 12 disposed on one end portion 14 of the light conductor 13. The light emitted from the dot-shaped light source 12 enters the light conductor 13/or reflected on the light reflector, and the light emitted from a surface 18 opposing to the transparent substrate 2 enters the transparent substrate 2, to thereby become a linear light source as a whole. Accordingly, since a fluorescent lamp which has been employed as a conventional light source is not used, impact resistance is improved, and illumination is enabled at a low voltage.

13 Claims, 8 Drawing Sheets

F I G. 9
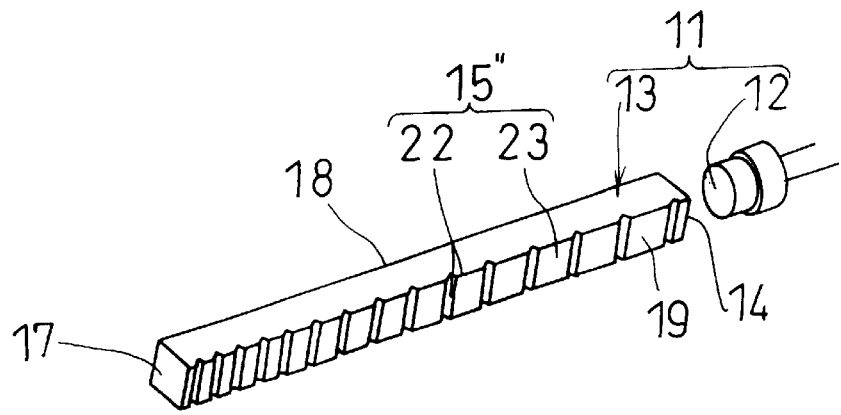
F I G. 10
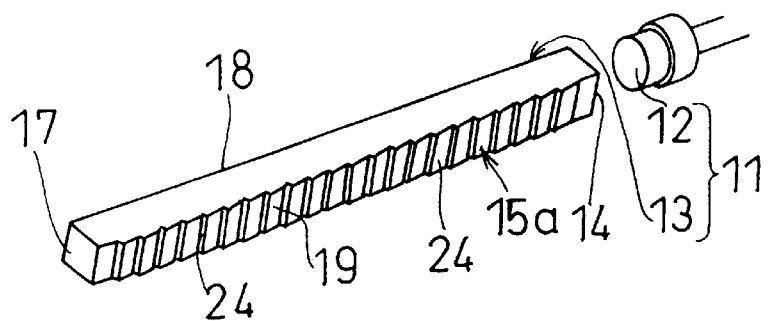
F I G. 11
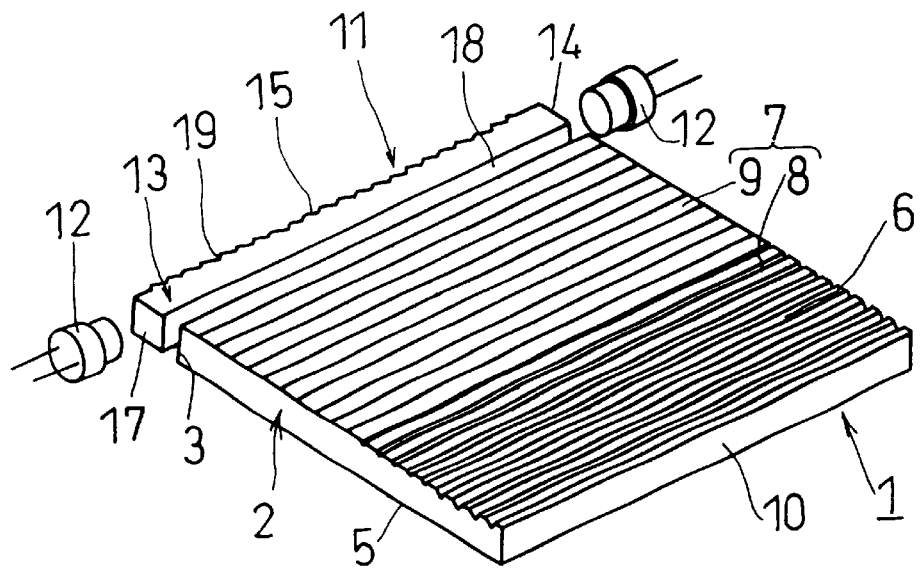

SPREAD ILLUMINATING APPARATUS

BACKGROUND OF THE INVENTION

1. Field of Invention

The present invention relates to a spread illuminating apparatus used as front-face illuminating means for various reflection-type display units and so on, and more particularly to a spread illuminating apparatus used as illuminating means for a liquid-crystal display unit.

2. Background of Related Art

A liquid crystal display unit that operates with a low electric power consumption increases in demand as a display unit which is mainly used in association with a computer since it has the features such as a thin-type, light-weight, etc. Liquid crystal which is a structural element of the liquid crystal display unit requires illuminating means for illuminating an image, which is different from a light-emission type element such as a CRT, because the liquid crystal does not emit light by itself. In particular, in demand for thinning the apparatus in recent years, there is frequently used a spread illuminating apparatus of a thin-plate-like side light type (light-conductive plate type) as illuminating means for irradiating the liquid crystal display unit.

Hereinafter, the structure of a spread illuminating apparatus 41 of the side light type will be described referred to FIG. 15.

Reference numeral 42 denotes a linear light source lamp such as a cold cathode fluorescent tube (CCFL) or a heat cathode fluorescent tube (HCFL) which is used as a light source of the spread illuminating apparatus. A transparent substrate 43 made of a material high in transmittance is shaped in a thin plate which is nearly rectangular in section. The light source lamp 42 is disposed at a given interval so as to be separated from and along one side end surface 44 thereof. For the purpose of illuminating the apparatus, the transparent substrate 43 may be shaped in a so-called wedge so as to be made gradually thinner as it is far from the one side end surface 44 along which the light source lamp 42 is disposed.

A lamp reflector 45 which is formed by evaporating silver or the like on a film is disposed on a portion, which is not opposite to the one side end surface 44, of the peripheral surface of the light source lamp 42. The provision of the lamp reflector 45 enables most of the light emitted from the light source lamp 42 to enter the interior of the transparent substrate 43 from the one side end surface 44. In addition, in order to prevent the leakage of the light, a reflection material 47 formed of a reflection tape or the like is added to side surfaces except for the one side end surface 44 of the transparent substrate 43 (only the side end surface 46 which is an opposite surface of the one side end surface 44 is shown in FIG. 15).

A light scattering pattern 49 (which will be described in detail later) is formed on a back surface 48 (lower side of FIG. 15) of the transparent substrate 43 in order to allow a light to be uniformly emitted from a screen of the spread illuminating apparatus unit without being influenced by a distance from the light source lamp 42, and a reflector 50 is disposed so as to cover the entire surface of the back surface 48 on the lower portion of the light scattering pattern 49. The reflector 50 allows a light which is supposed to be emitted from the back surface 48 of the transparent substrate 43 to be reflected thereby and to progress toward the front surface 51 of the transparent substrate 43 (toward an upper portion of FIG. 15).

Further, a diffusing plate 52 is disposed in the spread illuminating apparatus 41 so as to cover the entire front surface 51 of the transparent substrate 43. In order to avoid a phenomenon (a so-called dot image) that only the pattern of the light scattering pattern 49 is observed brightly because most of the light which progress in the transparent substrate 43 and is emitted from the front surface 51 is reflected at the light scattering pattern 49, the diffusing plate 52 is disposed, thereby a light passed through the diffusing plate 52 is superimposed on each other (that is, the light is diffused) to make the density and the emission distribution of a light substantially uniform to realize the uniform emission of the light on the screen.

The light scattering pattern 49 shown in FIG. 16 is formed in such a manner that the diameter of dots gradually increases from the one side end surfaces 44, along which the light source lamp 42 is disposed, toward the side end surfaces 46 which is an opposite surface of the one side end surface 44, for example, as disclosed in Japanese Patent Laid-open Publication No. Hei 5-134251. The light scattering pattern 49 is formed by coating a light diffusion-reflection material directly on the back surface 48 of the transparent substrate 43 by the screen printing system.

In this way, the light scattering pattern 49 allows the amount of light reflected thereby and emitted from the front surface 51 to change because the light scattering pattern 49 is formed by changing a rate of the light diffusion-reflection material per unit area depending on its location (hereinafter, the rate of predetermined material per unit area being called "area density"). That is, the light becomes higher in luminance as it is near the light source lamp 42. Therefore, in order to realize the uniform spread light emission, the light scattering pattern 49 is formed in such a manner that the area density of the light scattering pattern 49 increases more as it is far from the light source lamp 42 with the result that the amount of light reflected on the front surface 51 side increases more as it is far from the light source lamp 42. Therefore, taking the distance from the light source lamp 42 and the amount of light reflected by the light scattering pattern 49 into consideration, the light source lamp 42 is adapted to uniformly emit the light as a whole. The light scattering pattern 49 is indicated by oblique lines in FIG. 16 for the facilitation of understanding although it is not of a section.

The above-described light scattering pattern 49 is structured to coat the light diffusion-reflection material on the back surface 48 of the transparent substrate 43. However, since it is essential that the pattern 49 have a function of increasing the amount of reflected light, the pattern 49 may be designed in such a manner that a fine-concave/convex surface is formed directly on the back surface 48 of the transparent substrate 43, and the light is diffused or reflected by the concave/convex surface, for example, as disclosed in Japanese Patent Laid-open Publication No. Hei 9-33923.

Subsequently, a description will be given of the structure of an illuminating apparatus different from the above-described spread illuminating apparatus 41, which is particularly used as an auxiliary illuminating apparatus of the reflection type liquid crystal display device which is the illuminating means of the liquid crystal display device. Since the reflection type liquid crystal display device is structured in such a manner that the surrounding light is employed as illumination so that it can be irradiated on the screen when the surroundings are bright, no illuminating means is required inside of the device. However, in a case where the surroundings are relatively dark, since there occurs a drawback that it is difficult to observe an image, the auxiliary illuminating apparatus is required.

As an appropriate auxiliary illuminating means of the reflection type liquid crystal element of this type, there is disclosed, in Japanese Patent Application No. Hei 9-347648, a spread illuminating apparatus disposed on a front surface (screen side) of the reflection type liquid crystal element.

A transparent and spread illuminating apparatus 1' shown in FIG. 17 is disposed so as to cover the observation face F of the reflection type liquid crystal element L thus structured in use, and its structure is that a linear light source lamp 4 is disposed so as to be close to one side end surface 3 of the flat transparent substrate 2 which is made of a material high in transmittance and shaped in a rectangle in section as shown in FIGS. 17 and 18. The light source lamp 4 is formed of a cold cathode fluorescent tube (CCFL), a heat cathode fluorescent tube (HCFL) or the like.

Further, for the purpose of reducing weight of the apparatus, the transparent substrate 2 may be formed in a wedge-shaped so as to be made gradually thinner as it is far from the one side end surface 3 along which the light source lamp 4 is disposed.

In this example, it is assumed that, in FIG. 17, one surface (a lower side in FIG. 18) of the transparent substrate 2 on which the reflection type liquid-crystal element L abuts is a lower surface 5, and its opposite surface (an upper side in FIG. 18) that is on an observation face (screen) side is a top surface 6.

A light reflection pattern 7 is formed on the top surface 6 of the transparent substrate 2. The light reflection pattern 7 is made up of a large number of grooves 8 which are substantially triangular in section and a large number of flat portions 9 adjacent to the grooves 8.

The light reflection pattern 7 is designed in such a manner that intervals between which the grooves 8 are defined are different depending on position so that the brightness becomes nearly uniform at any positions of the transparent substrate 2 without being influenced by the distances from the light source lamp 4 as shown in FIG. 18. In other words, the ratio of the width (occupied area) of the grooves 8 to the width (occupied area) of the flat portions 9 is so set as to gradually increase more as far from the one side end surface 3 of the transparent substrate 2.

With the addition of the transparent and spread illuminating apparatus 1' thus structured to the reflection type liquid crystal element L as an auxiliary illumination, a light emitted from the light source lamp 4 is made incident to the interior of the transparent substrate 2 from the one side end surface 3 of the transparent substrate 2, and progresses toward the opposite surface 10 while the light repeats reflection and refraction in the interior of the transparent substrate 2. During this action, the light is emitted from the lower surface 5 of the transparent substrate 2 little by little with the result that the light is irradiated on the reflection type liquid crystal element L which is disposed in close contact with the transparent substrate 2. In addition, since the light reflection pattern 7 is formed on the transparent substrate 2, the the distribution of amount of light emitted from the lower surface 5 can become nearly uniform.

Although being omitted in FIGS. 17 and 18, since a peripheral surface of the light source lamp 4 which is not faced on the one side end surface 3 is covered with a film-shaped reflection member, the coupling efficiency of a light can be enhanced. Furthermore, if the side surfaces of the transparent substrate 2 except for the one side end surface 3 are also covered with a reflection member, since the light is prevented from being emitted from the side end surfaces, the amount of light from the lower surface 5 of the transparent substrate 2 can be increased. In particular, in the opposite surface 10 of the one side end surface 3, since the amount of emitted light is more than those of two other side surfaces, it is desirable that the opposite surface 10 is covered with a reflection member.

Also, a direction of the light emitted from the lower surface 5 of the transparent substrate 2 varies as an angle of reflection of the light changes in accordance with the configuration of the grooves 8 of the light reflection pattern 7. As a result, the configuration of the groove 8 can be appropriately set so that a large amount of light is emitted in a direction perpendicular to the lower surface 5 (that is, a front-surface direction).

By the way, because both of the above-described spread illuminating apparatuses 41 and 1' used as the illuminating means of the liquid crystal display device (also including the reflection type liquid crystal element L) use the cold cathode fluorescent tube (CCFL), the heat cathode fluorescent tube (HCFL) or the like as a light source, they suffer from problems stated blow.

That is, the above fluorescent tubes used as the light source lamps 4 and 42 have a tendency that their diameters are extremely reduced to satisfy the needs for thinning the apparatus recently, accordingly, since those tubes might be broken by even small impact, its handling must be done carefully.

In addition, in order to allow the fluorescent tubes used as the light source lamps 4 and 42 to emit a light, because a high voltage of several hundreds to 1000 V or higher is generally required, the fluorescent tubes are provided with a complicated illuminating circuit which is so-called inverter. For this reason, a space in which the inverter is located must be always ensured, and a demand for reducing the space where the inverter occupies increases in the needs for thinning and illuminating the apparatus. Also, there arises such a problem that a complicated countermeasure is required from the viewpoint of safety in high voltage.

If the fluorescent tube (linear light source) having the above problem is replaced by a dot-shaped light source such as an electric bulb or a light emission diode as the light source lamps 4 and 42, the above problem can be eliminated. However, in the case where the dot-shaped light sources are merely disposed on positions at which the light source lamps 4 and 42 of the above conventional spread illuminating apparatuses 41 and 1' are disposed, there arises such a problem that only a portion in the vicinity of the dot-shaped light source becomes bright with the result that uniformly spread light emission all over the top surface 6 cannot be realized.

SUMMARY OF THE INVENTION

The present invention has been made to solve the above problems, and therefore an object of the present invention is to provide a spread illuminating apparatus which is capable of realizing uniform spread light emission by use of a light source lamp that is excellent in handling by improving impact resistance to prevent damage and also requires no illuminating unit such as an inverter and no care of safety by illuminating at a low voltage.

In order to achieve the above object, according to a first aspect of the present invention, in order to make an incidence into a transparent substrate, a linear light source consisting of a dot-shaped light source and an optical path conversion means is disposed in the vicinity of at least one side surface of the transparent substrate. Wherein, regardless of the light transmission medium such as air and transparent material, an "optical path conversion means" includes a mirror, a transparent substrate having engraved triangular groove which make a light progressing direction change by reflection or refraction. And, a "linear light source" means a state where dot-shaped lights are disposed in a line.

According to a second feature of the present invention, said optical light path conversion means is made of a light conductor made of a linear transparent material and disposed in the vicinity of the side surface of the transparent substrate and on the opposite surface to the opposing surface of the light conductor to the transparent substrate an optical light conversion portion is formed at least on one end portion of said light conductor.

According to a third aspect of the present invention, the light conductor and the transparent substrate are partially connected in a unitary manner to each other. Thereby, there is no need of positioning each other.

According to a fourth aspect of the present invention, the optical path conversion means is formed with the light conductor and a light reflection member which is disposed over the opposite surface to the opposing surface of the light conductor and reflects the light emitted from the opposite surface outwardly and directs it toward the transparent substrate. Thereby, the light reflection member is concretely an aluminum plate or a mirror as a kind of optical path conversion means. Therefore, if the aluminum plate is bent like a saw teeth in section, it becomes a linear source in combination with the dot-shaped light source.

According to a fifth aspect of the present invention, the optical path conversion portion is formed on at least either one of the side surface opposing to the transparent substrate or the surface opposite to the opposing surface of the light conductor and its opposite surface. Whereby, although most lights reflected by the optical path conversion portion formed on the side surface of the opposing to the transparent substrate are directed toward the direction opposite to the transparent substrate, these are reflected by the reflection member to direct toward the transparent substrate.

According to a sixth aspect of the present invention, a dot-shaped light is disposed one or both end of the light conductor.

According to a seventh aspect of the present invention, the light reflection member is formed with a vapored metal to increase a reflective efficiency.

According to an eighth aspect of the present invention, the optical path conversion portion is formed with a fine-concavo-convex face and a flat portion.

According to a ninth aspect of the present invention, the optical path conversion portion structured by the light scattering portion on which a white or milky paint is partially coated.

According to a tenth aspect of the present invention, the optical path conversion portion is structured by continuously forming the light scattering portion formed of groove and the flat portion.

According to an eleventh aspect of the present invention, the optical path conversion portion comprises the light scattering portion obtained by continuously forming inclined surface which is substantially triangular in section.

According to a twelfth aspect of the present invention, the optical path conversion portion is formed so that the area density of said light scattering portion increases more in proportion to the distance of the dot-shaped light source.

According to a thirteenth aspect of the present invention, a sectional area perpendicular to a longitudinal direction of the light conductor becomes smaller in proportion to the distance of the dot-shaped light source.

According to a fourteenth aspect of the present invention, a light reflection member which covers all of a peripheral surface of said light conductor except for the surface opposing the transparent substrate.

According to a fifteenth aspect of the present invention, a sectional figure perpendicular to a longitudinal direction of the light conductor is non-circular.

According to a sixteenth aspect of the present invention, the linear light source is formed in a combination with the light reflection member formed like a saw teeth in section and a dot-shaped light source.

With the above structure, according to the spread illuminating apparatus of the present invention, the linear light conductor is disposed along the side end surface of the transparent substrate and the dot-shaped light source is disposed on the end portion of the light conductor as a light source that realizes spread illumination. As a result, since the light emitted from the dot-shaped light source enters the light conductor, the light emitted from a surface opposing to the transparent substrate enters the transparent substrate to realize spread illumination.

BRIEF DESCRIPTION OF THE DRAWINGS

These and other objects, features and advantages of this invention will become more fully apparent from the following detailed description taken with the accompanying drawings in which:

FIG. 9 is an exploded perspective view showing the structure of a light source different from that of FIG. 8, which is a main portion of the present invention;

FIG. 10 is an exploded perspective view showing the structure of a light source different from that of FIG. 9, which is a main portion of the present invention;

FIG. 11 is an exploded perspective view showing the structure of a spread illuminating apparatus in accordance with the present invention, which is different from that of FIG. 1;

DETAILED DESCRIPTION OF PREFERRED EMBODIMENTS

Now, a description will be given in more detail of a spread illuminating apparatus 1 in accordance with an embodiment of the present invention referring to the accompanied drawings.

Figure 17:
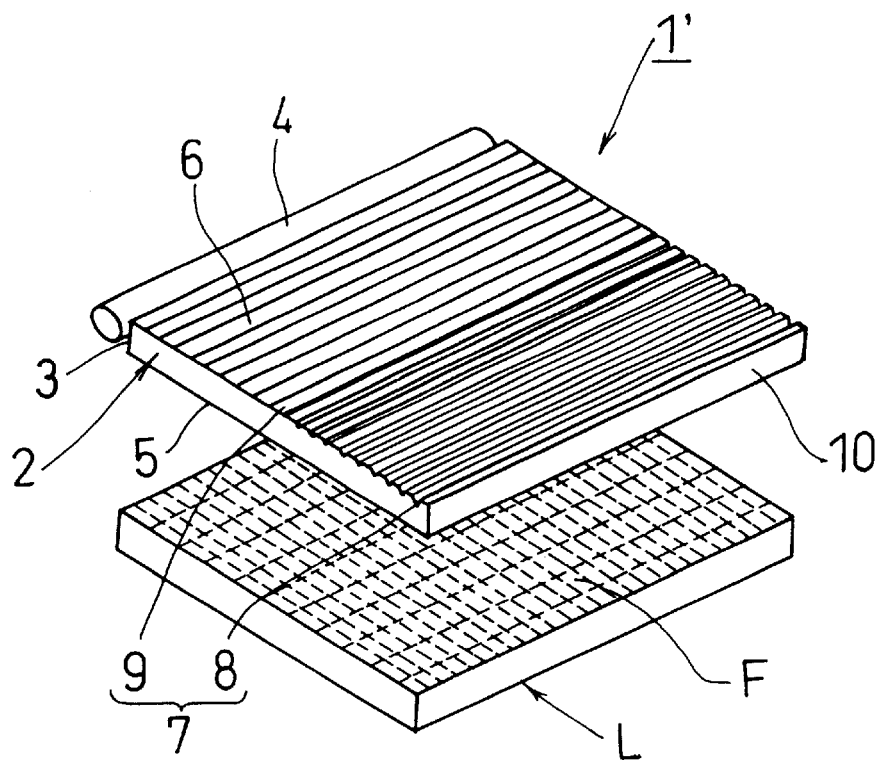
FIG. 17 is an exploded perspective view showing the structure of a conventional spread illuminating apparatus in accordance with the present invention, which is different from that of FIG. 15.
Figure 18:
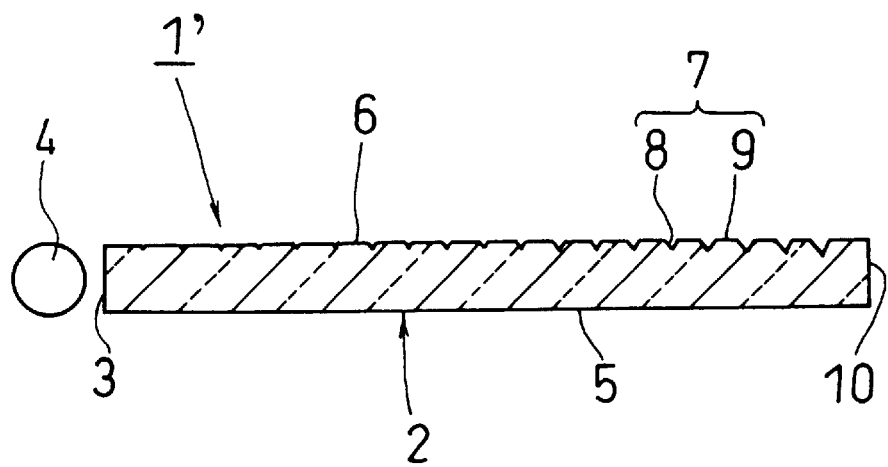
FIG. 18 is a schematically cross-sectional view showing the spread illuminating apparatus shown in FIG. 17.

Further, the spread illuminating apparatus 1 is employed for the same purpose as that of the spread illuminating apparatus 1', which is disposed so as to cover an observation face F of a reflection type liquid crystal display device L, which was described in section of "Background of Related Art" referring to FIGS. 17 and 18. Therefore, the same parts as those of the conventional spread illuminating apparatus 1' are denoted by the identical references, and their detailed description will be omitted.

Figure 1:
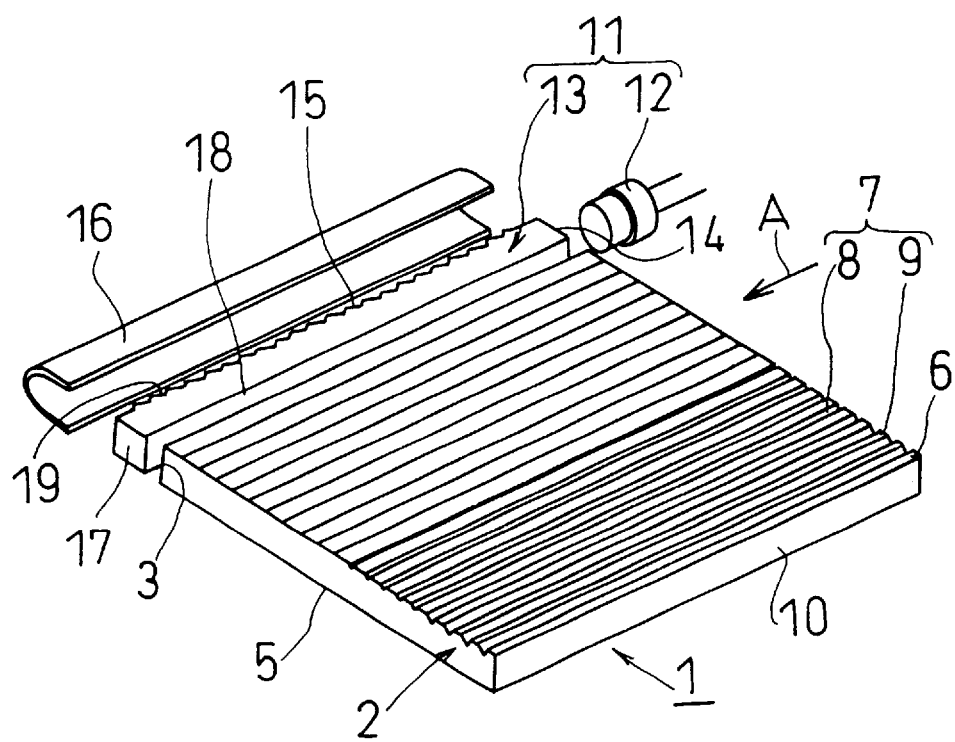
FIG. 1 is an exploded perspective view showing the structure of a spread illuminating apparatus in accordance with an embodiment of the present invention.
Figure 2:
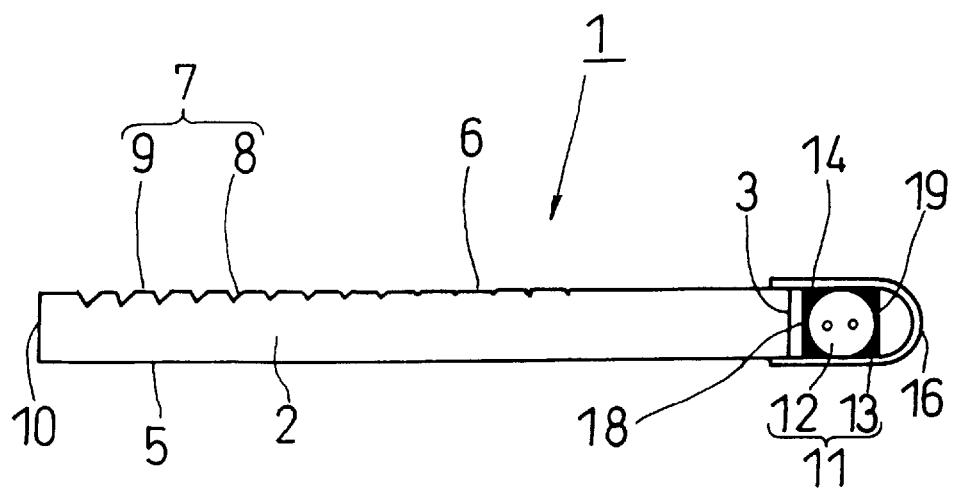
FIG. 2 is a diagram showing the structure of a spread illuminating apparatus observed from an arrow A in FIG. 1.

As shown in FIGS. 1 and 2, the spread illuminating apparatus 1 of the present invention mainly includes a transparent substrate 2 and a light source 11 (which will be described in detail later), in which a lower surface 5 of the transparent substrate 2 is disposed on an observation face F side of a reflection type liquid crystal element L, which is substantially the same as in the conventional one. A difference between the apparatus of the present invention and the conventional apparatus resides in that the conventional linear light source that serves as the light source lamp 4 is replaced with a dot-shaped light source 12 and a bar-shaped light conductor 13 (which is indicated by black color in FIG. 2 for facilitation of understanding) as the light source 11.

In this embodiment, a light emission diode is employed as the dot-shaped light source 12, and the light conductor 13 made of a transparent material is disposed along one side end surface 3 of the transparent substrate 2 at a predetermined distance. The dot-shaped light source 12 is disposed closely on one end portion 14 of the light conductor 13. An optical path conversion means 15 which will be described in detail later is formed on the light conductor 13. In addition, the periphery in the longitudinal direction of the light conductor 13 except for a surface opposite to the transparent substrate 2 is covered with a light reflector 16 in order to lead a light to the interior of the transparent substrate 2 with high efficiency.

The light reflector 16 permits the light to be led to the interior of the transparent substrate 2 with a higher efficiency by addition of another dot-shaped light source 12 to the other end portion 17 of the light conductor 13 where no dot-shaped light source 12 is disposed. Also, in the case where the peripheral surface of the light conductor 13 cannot be covered with the light reflector 16 for the reason of design, etc., if at least only a portion where the optical path conversion means 15 is formed is covered with the light reflector at least, the efficiency is remarkably improved. The light reflector is formed of a sheet-like member such as a white film or a film on which a white paint is coated, or a member obtained by bending a metal plate such as an aluminum plate which has been applied by mirror polishing.

Hereinafter, the optical path conversion means 15 formed on the light conductor 13 will be described referring to FIG. 3.

The optical path conversion means 15 includes a light scattering portion 20 (a black portion in FIG. 3) obtained by partially subjecting an opposite surface 19 of a surface 18 (refer to FIGS. 1 and 2) facing one side end surface 3 of a transparent substrate 2 to a roughening process to form fine roughness, and a flat portion 21 which is not subjected to the roughening process. Since the light scattering portion 20 is formed with fine roughness, a light reflected by the light scattering portion 20 among the light which is emitted by the dot-shaped light source 12, enters the interior of the light conductor 13 from the end portion 14 and is then reflected by the opposite surface 19, increases in the amount of light which passes through the surface 18 and, as a result, progresses to the interior of the transparent substrate 2.

Figure 3:
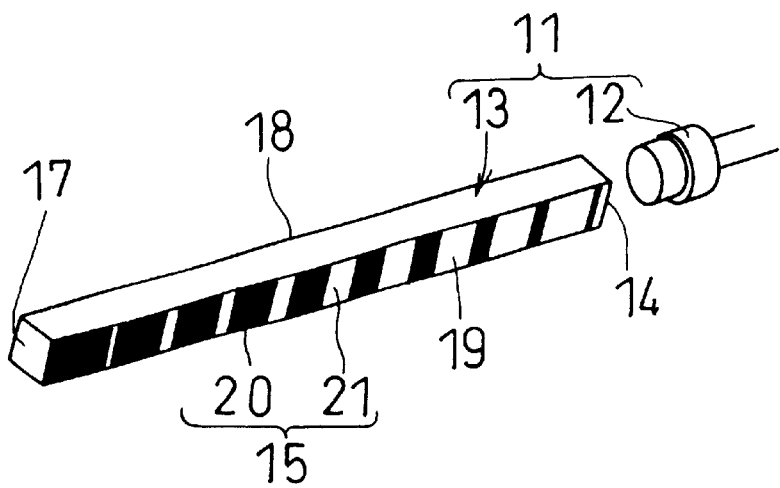
FIG. 3 is an exploded perspective view showing the structure of a light source which is a main portion of the present invention.

For that reason, as shown in FIG. 3, the optical path conversion means 15 is designed in such a manner that the area of the light scattering portion 20 increases more as it is far from the dot-shaped light source 12. As a result, the light scattering portion 20 is formed taking a distance from the dot-shaped light source 12 and the area of the light scattering portion 20 into consideration so that the amount of light that is emitted from the surface 18 increases more as the light scattering portion 20 is far from the dot-shaped light source 12. As a result, the light is uniformly irradiated from the surface 18 regardless of the disposition of the dot-shaped light source 12 on the end portion 14. Consequently, the light source 11 made up of the dot-shaped light source 12 and the light conductor 13 functions in the same manner as that of the conventional linear light source.

Further, the uniform spread light emission of the spread illuminating apparatus 1 is identical with that of the spread light source unit 1' which was described in section "Background of Related Art", and therefore its description will be omitted.

A surface roughening method for forming the light scattering portion 20 that constitutes the optical path conversion means 15 of the light conductor 13 may be a method in which the opposite surface 19 of the light conductor 13 is directly processed by sand blasting or the like. In the case where the light conductor body 13 is prepared using a transparent resin material, there is applicable a method in which fine-rough surface is previously formed on predetermined positions of a mold through sand blasting, etching or the like in advance to mold the light conductor 13 while transferring the light scattering portion 20 to the light conductor 13.

Figure 4:
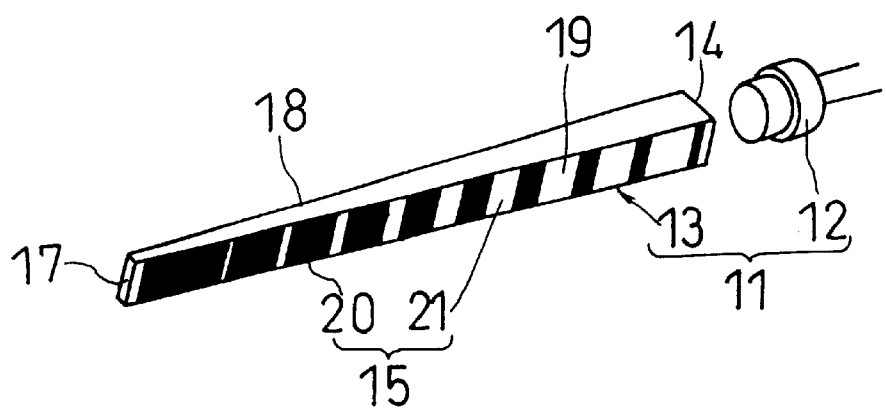
FIG. 4 is an exploded perspective view showing the structure of a light source different from that of FIG. 3, which is a main portion of the present invention.

In addition, as shown in FIG. 4, the light source 11 may be structured such that the light conductor 13 is shaped in a wedge, and the dot-shaped light source 12 is disposed on one of both end portions which is larger in area as the end portion 14. Since the light source 11 thus structured can be reduced in volume in proportion of the volume in which the other end portion 17 side is thinned, the light source 11 can be lightened in weight. In case of this structure, since the opposite surface 19 is tapered in such a manner as being inclined with respect to the surface 18, each angle of reflection of the light that progresses to the interior of the light conductor 13 on the opposite surface 19 differs depending on positions. That is, as being away from the dotted-shaped light source 12, since the light reflected on the surface 18 due to a large incident angle changes its progressing direction to perpendicular direction relative to the surface 18 while repeatedly reflected on the opposite surface 19, it is necessary to take the angle of inclination of the opposite surface 19 into consideration so that the light is uniformly irradiated on the surface 18.

Figure 5:
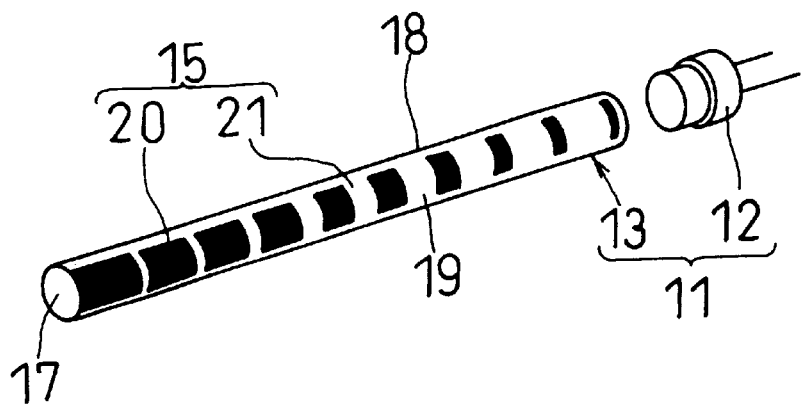
FIG. 5 is an exploded perspective view showing the structure of a light source different from that of FIG. 4, which is a main portion of the present invention.

The light conductor 13 is not limited to a four-sided figure in section as shown in FIGS. 3, 4 and other figures. For example, as shown in FIG. 5, there may be employed the light conductor 13 which is circular in section.

Figure 6:
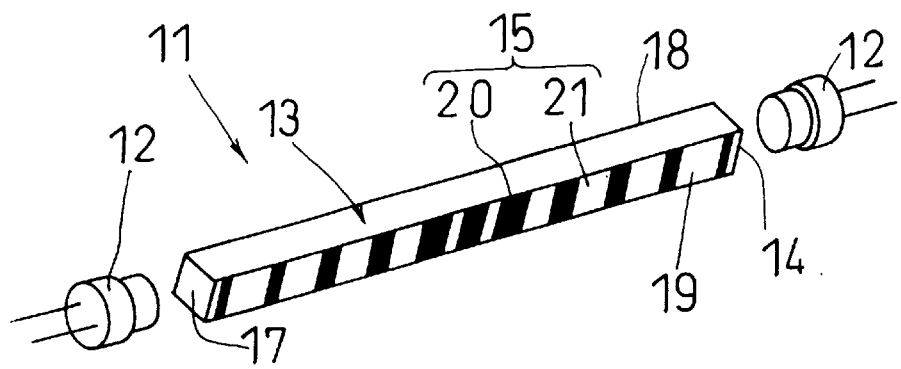
FIG. 6 is an exploded perspective view showing the structure of a light source different from that of FIG. 5, which is a main portion of the present invention.

In order to improve the luminance of the light source 11, the light source 11 shown in FIG. 6 is designed such that another dot-shaped light source 12 is disposed on the other end portion 17 side in addition to the dot-shaped light source 12 disposed on the end portion 14 of the light conductor 13. Thus, in the case where the respective dot-shaped light sources 12 are disposed on both ends 14 and 17 of the light conductor 13, the optical path conversion means 15 is formed in such a manner that the area of the light scattering portion 20 becomes maximum in the vicinity of the center of the light conductor 13, and gradually reduces toward both ends 14 and 17 thereof so that the amount of light irradiated on the surface 18 is made uniform. In this way, when two dot-shaped light sources 12 are disposed, the luminance of the light source 11 is nearly twice as large as that of the light source 11 shown in FIG. 3.

Figure 7:
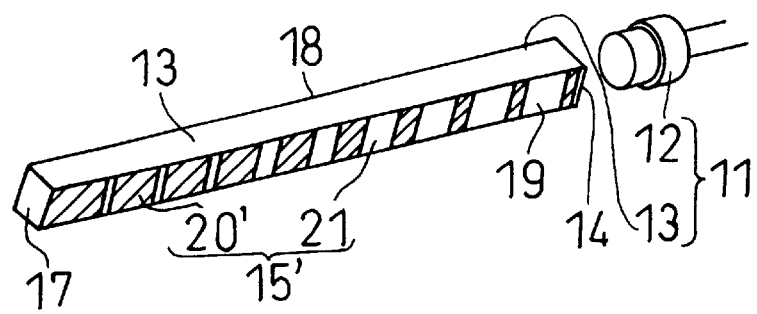
FIG. 7 is an exploded perspective view showing the structure of a light source different from that of FIG. 6, which is a main portion of the present invention.

In addition, the light source 11 shown in FIG. 7 is formed such that a light scattering portion 20' (a portion indicated by oblique lines in FIG. 7) is coated with a white paint (a milky paint is also available), which is the optical path conversion means 15' of the light conductor 13. The provision of the light scattering portion 20' coated with the white paint makes the reflection factor higher than that of the flat portion 21. Accordingly, when the light is reflected by the light scattering portion 20', the amount of light that passes through the surface 18 and then progresses to the interior of the transparent substrate 2 increases. For the above reason, the light scattering portion 20' is formed in such a manner that its area increases more as the light scattering portion 20' is far from the dot-shaped light source 12 as described in the above-described light scattering portion 20 formed with roughness. With this structure, uniform light emission on the surface 18 is realized.

As a method of coating a paint on the light scattering portion 20', there is applicable a normal coating method such as screen printing, other general printing or spray painting.

Figure 8:
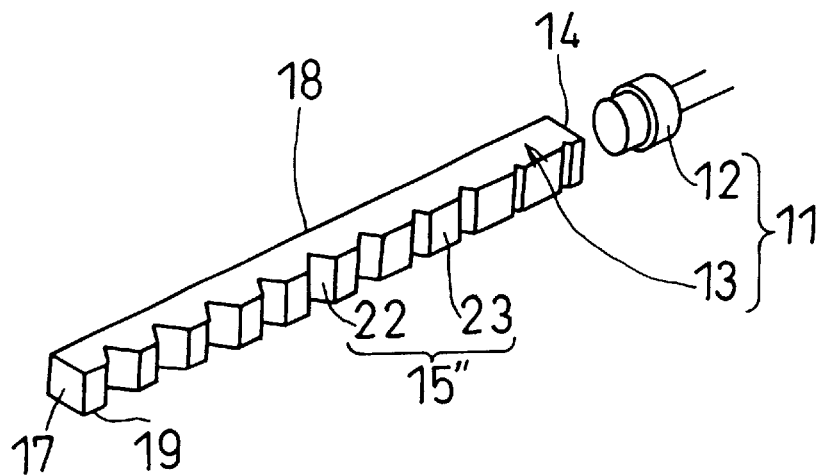
FIG. 8 is an exploded perspective view showing the structure of a light source different from that of FIG. 7, which is a main portion of the present invention.

Further, the light source 11 shown in FIGS. 8 and 9 is designed in such a manner that the optical path conversion means 15" of the light conductor 13 is made up of grooves 22 which are substantially triangular in section and flat portions 23 formed between the respective grooves 22. In the case where the light is reflected by the grooves 22, the light that progresses to the interior of the light conductor 13 and is then reflected on the opposite surface 19 is liable to progress substantially perpendicularly to the surface 18 by the inclined surfaces of the grooves 22. Thus, the amount of light that passes through the surface 18 and progresses to the interior of the transparent substrate 2 increases in comparison with that in the case where the light is reflected by the flat surface portions 21. Therefore, the ratio of the width of the grooves 22 (an occupied area) to the width of the flat portions 23 (an occupied area) is so set as to gradually increase as they are far from the end portion 14 of the light conductor 13. The optical path conversion portion 15" of the light conductor 13 is formed taking a distance from the dot-shaped light source 12 and the area occupied by the grooves 22 into consideration, as a result of which the light is uniformly irradiated on the surface 18 regardless of the disposition of the dot-shaped light source 12 on the end portion 14.

In order to actually change the ratio between the occupied area of the grooves 22 and that of the flat portions 23, in case of the optical path conversion portion 15" shown in FIG. 8, while intervals (pitches) between the respective adjacent grooves 22 are kept constant, the depths of the grooves 22 are so set as to gradually increase as they are far from the dot-shaped light source 12. On the other hand, in case of the optical path conversion means 15" shown in FIG. 9, while the depths of the grooves 22 are kept constant, the intervals (pitches) between the respective grooves 22 are so formed as to get gradually narrow.

The grooves 22 that constitutes the optical path conversion portion 15" is substantially triangular-shaped in section. However, the grooves 22 are not limited to this configuration. The section of the grooves 22 may be shaped in substantially four-sided figure, in other polygons, or in a curved surface which is made in such a manner as the respective surfaces composed of the grooves 22 are connected smoothly.

In addition, there may be applied an optical path conversion portion 15"a resulting from continuously forming mountain portions 24 consisting of two inclined surfaces which forms substantially a triangle in section as shown in FIG. 10. Similarly, in this case, in order to realize the uniform emission of light on the surface 18, it is necessary to form the optical path conversion portion 15"a taking the angle of inclination, the size and the interval of the mountain portion 24 in consideration.

Subsequently, various examples for further improving the luminance of a screen will be described in comparison with the spread illuminating apparatus 1 shown in FIG. 1. The light reflector 16 that covers the peripheral surface of the light source 11 is omitted from the drawings. The spread illuminating apparatus 1 uses the light source 11 having a structure of two dot-shaped light sources as described on the basis of FIG. 11, which are disposed to oppose the surface 18 of the light conductor 13 along one end surface of the transparent substrate 2.

Figure 12:
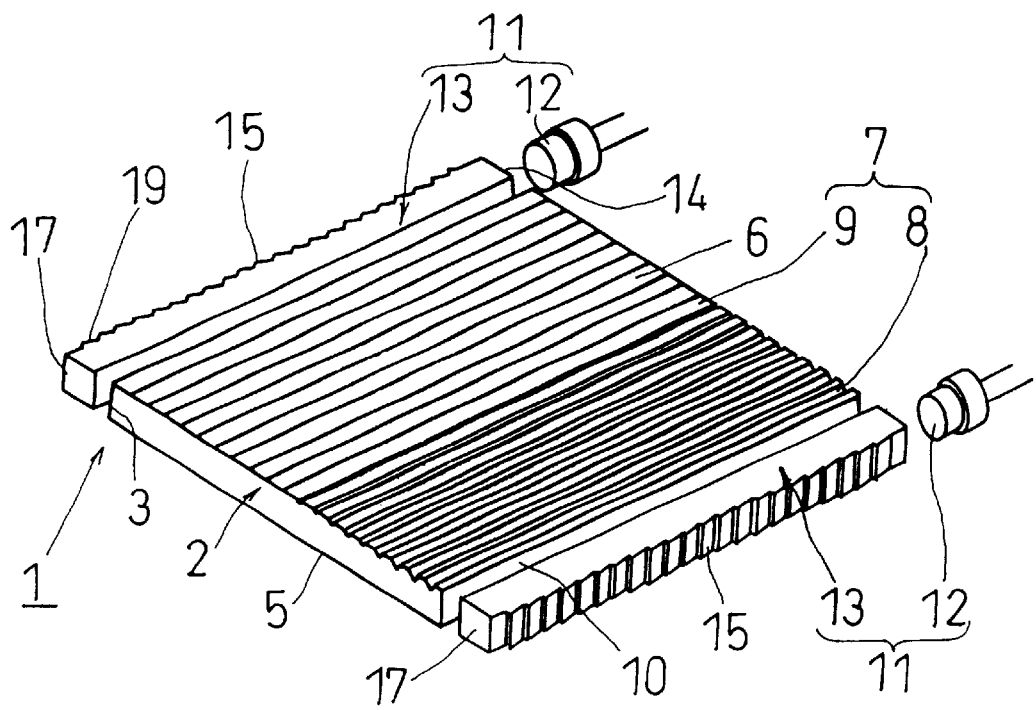
FIG. 12 is an exploded perspective view showing the structure of a spread illuminating apparatus in accordance with the present invention, which is different from that of FIG. 11.

A spread illuminating apparatus 1 shown in FIG. 12 employs a plurality of light sources 11 each made up of a dot-shaped light source 12 and a light conductor 13, and one light source 11 is disposed on one side end surface 3 where the light source 11 is provided in the case where a single light source 11 is used, and another light source 11 is similarly disposed on the opposite surface 10 side in a similar way. In this example, it is needless to say that in order to realize the uniform emission of light over the entire screen of the spread illuminating apparatus 1, the spread illuminating apparatus 1 is formed taking the pattern of the light scattering pattern 7 into consideration.

Also, the positions at which the light sources 11 are located are not limited to the one side end surface 3 and the opposite surface 10 of the transparent substrate 2, but the light sources 11 can be located on any side surfaces of the transparent substrate 2. Further, since the number of light sources 11 used is not limited to two, more light sources 11 may be located.

Figure 13:
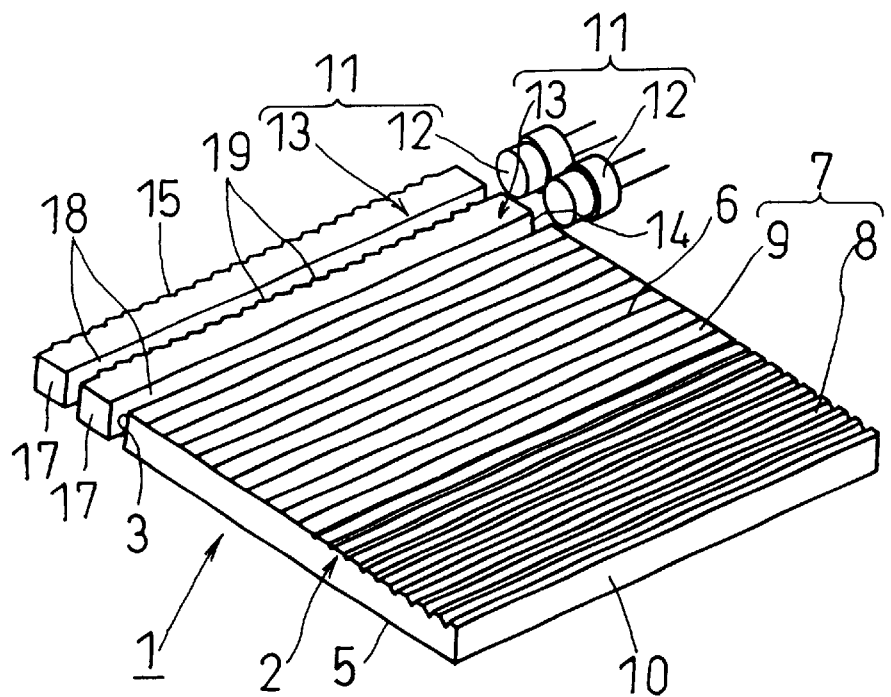
FIG. 13 is an exploded perspective view showing the structure of a spread illuminating apparatus in accordance with the present invention, which is different from that of FIG. 12.

A spread illuminating apparatus 1 shown in FIG. 13 is designed in such a manner that two light sources 11 are continuously disposed side by side along the one side end surface 3 of the transparent substrate 2. Since the light conductor 13 is made of a transparent material, the light emitted from the light source 11 on a side positioned outwardly is not prevented from being made incident to the transparent substrate 2.

As described above, the structural examples of the spread illuminating apparatus 1 for the purpose of improving the luminance of a screen can be combined at will, respectively, to thereby further improve the luminance.

Figure 14:
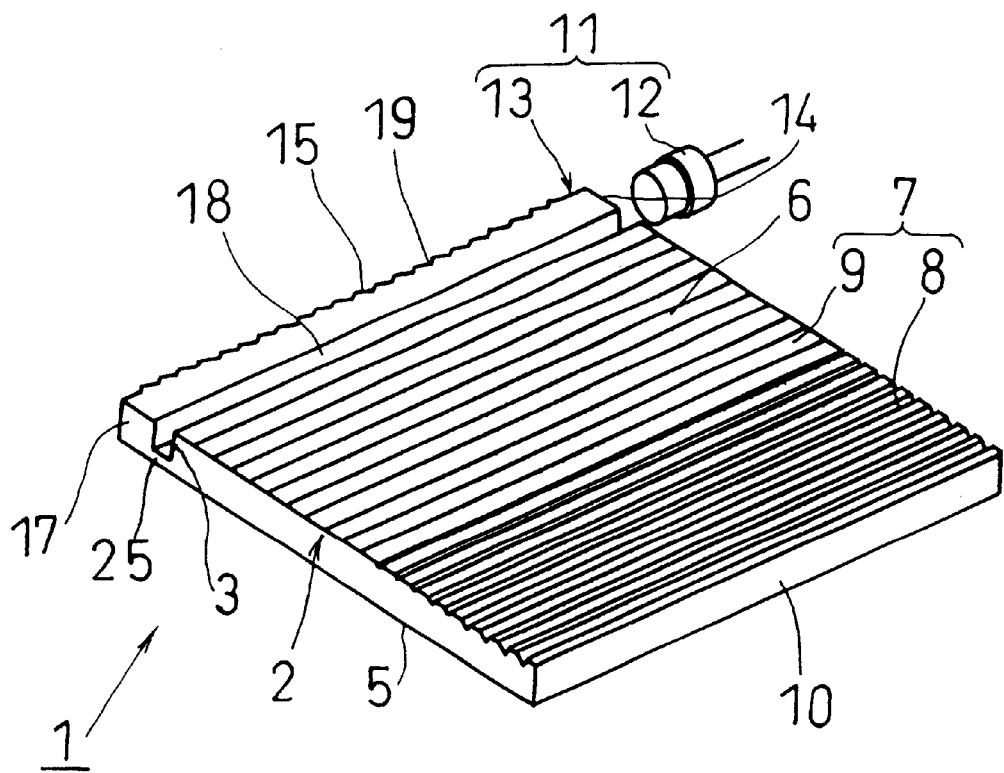
FIG. 14 is an exploded perspective view showing the structure of a spread illuminating apparatus in accordance with the present invention, which is different from that of FIG. 13.

A spread illuminating apparatus shown in FIG. 14 is designed in such a manner that a connecting portion 25 that extends from the lower surface 5 of the transparent substrate 2 to the lower surface of the light conductor 13 of the light source 11 is formed so that the transparent substrate 2 and the light conductor 13 are integrated with each other. In this way, the provision of the connecting portion 25 enables the transparent substrate 2 and the light conductor 13 to be molded at the same time, and the number of parts is reduced, thereby to make possible to reduce the number of assembling processes. It is desirable that the connecting portion 25 is as small as possible within the limits that the mechanical strength is permitted from the viewpoint of efficiency.

Also, in this example, the dot-shaped light source 12 is formed of a light emission diode, but not limited to this. For example, a dot-shaped light source which can be illuminated at a relatively low voltage such as an electric bulb can be employed as the dot-shaped light source 12 of the present invention.

The light conductors 13 as described on the basis of various embodiments are not limited only to a four-sided figure (refer to FIG. 3) and a circle (refer to FIG. 5) in section, but are applicable also to a shape such as a polygon or an oval except for the four-sided figure. In addition, even if the sectional shape is not of the four-sided figure as described in the wedge-shaped light conductor 13 shown in FIG. 4, its sectional shape may be so formed as to gradually decrease more as it is far from the dot-shaped light source 12. Further, the light conductor 13 may be so shaped as to vary its sectional shape (for example, the sectional shape varies from a circle to a four-sided figure and the like).

If the material of the light conductor 13 is a material that allows a light to be passed therethrough with high efficiency, there is no problem, and acrylic resin is most suitable to that material from the viewpoints of transmittance and feasibility in process. However, in the case of implementing the present invention, the material is not particularly limited to acrylic resin, and instead, various thermoplastic transparent resin such as vinyl chloride resin, polycarbonate resin, olefinic resin or styrene resin is applicable. Also, thermosetting transparent resin such as epoxy resin or allyldiglycol carbonate resin or inorganic transparent material such as various glass materials may be applicable if there is a demand.

As a method of producing the light conductor 13, there are applicable a direct mechanical process such as cutting or grinding, or various molding methods such as a casting method, a heat molding method, an extrusion molding method or an injection molding method. However, the injection molding method using a resin material is most suitable from the viewpoint of productivity.

In addition, the optical path conversion portion 15 formed on the light conductor 13 is so structured as to be formed on only the opposite surface 19 in this embodiment. However, the optical path conversion portion may be formed on another surface except for the opposite surface 19 as well as the opposite surface 19 so as to be provided over a larger area.

Figure 15:
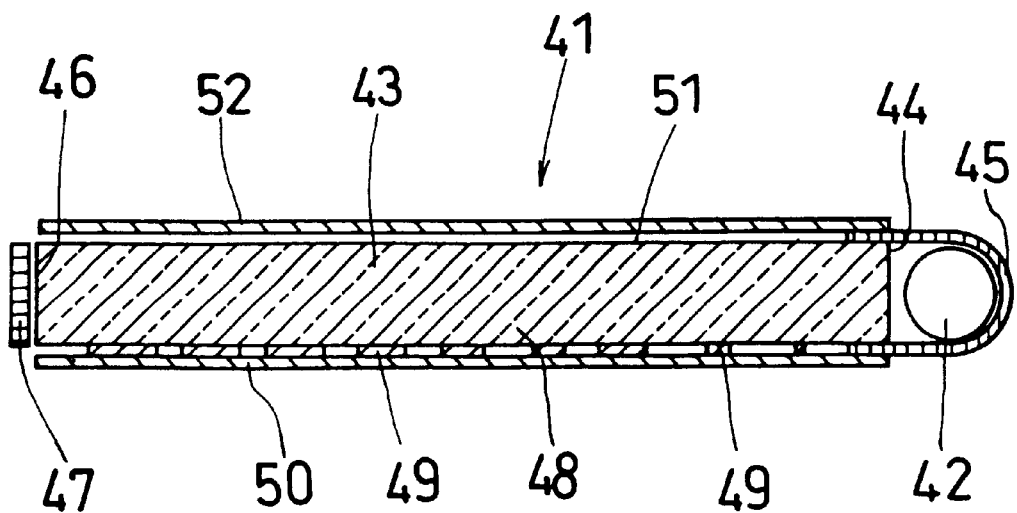
FIG. 15 is a cross-sectional view showing the structure of a conventional spread illuminating apparatus.
Figure 16:
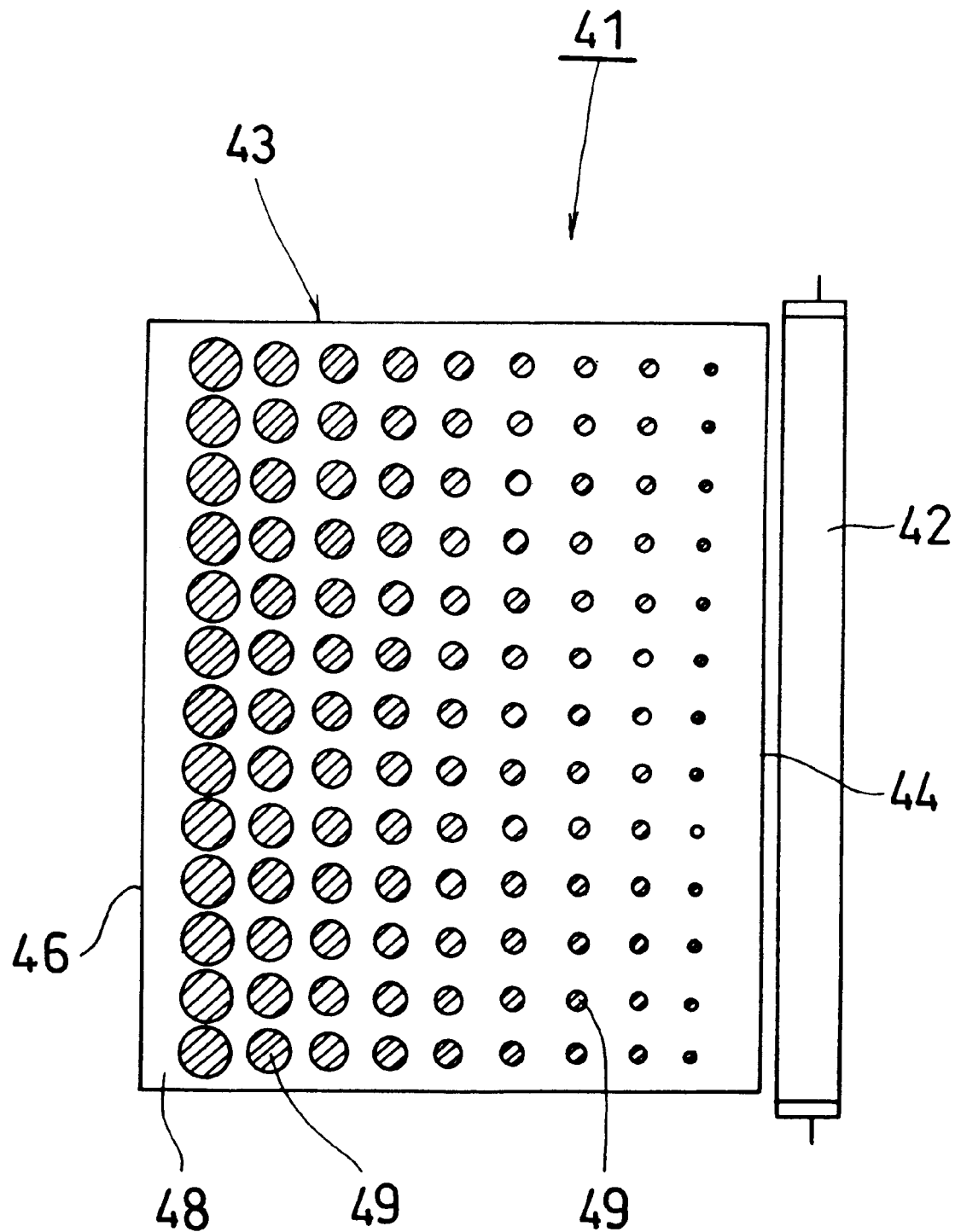
FIG. 16 is a schematic diagram for explanation of a light scattered pattern in a spread illuminating apparatus shown in FIG. 15.

In the above embodiment, the spaced illuminating apparatus (refer to FIGS. 17 and 18) disposed on the front surface of the reflection type liquid crystal was mainly described as the auxiliary illumination of the reflection type liquid crystal apparatus. However, the present invention is not limited to, for example, the light source lamp 42 of the spread illuminating apparatus 41 which serves as the back surface illuminating means of the transmission type liquid crystal as shown in the conventional examples of FIGS. 15 and 16 can be replaced with the structure of the light source 11 of the present invention. Further, the present invention can be applied to all the illuminating apparatuses having the fluorescent lamp as a light source.

As was described in detail above, in the side light type spread illuminating apparatus according to the first aspect of the present invention, there is used a light source comprising a light conductor made of a linear transparent material and disposed along all over the entire at least one surface of said transparent substrate, and a dot-shaped light source disposed on at least one end portion of said light conductor. As a result, the light emitted from the dot-shaped light source enters the light conductor, and the light emitted from a surface opposite to the transparent substrate enters the transparent substrate, to thereby become a linear light source as a whole. As a result, since the light source of the present invention can be employed as the illuminating means of the spread illuminating apparatus without using a fluorescent lamp which has been used as a conventional light source, illumination is enabled at a low voltage, no illuminating unit such as an inverter is required, and a care of safety is not required. In addition, because the light conductor made of the transparent material is used, an impact resistance is remarkably improved to prevent damage, thereby to make possible to improve in handling, in comparison with a case in which a fluorescent lamp of the same size as that of the light conductor is used.

According to the second aspect of the present invention, since the light conductor and a transparent substrate are partially integrally connected to each other, there is advantageous in that the number of parts required is reduced, and an assembling work and so on are reduced, in addition to the same advantages as those of the first aspect of the present invention.

According to the third aspect of the present invention, since the light conductor reduces in sectional area more as said light conductor is far from the dot-shaped light source, the apparatus can be reduced in weight. Also, there are the same advantages as those of the first aspect of the present invention.

According to the fourth aspect of the present invention, since the light conductor is substantially four-sided figure in section, stability is excellent so that a fixing work is facilitated. Also, there are the same advantages as those of the first aspect of the present invention.

According to the fifth aspect of the present invention, since the light conductor is substantially circular in section, a light is uniformly emitted at positions where a distance from the dot-shaped light source is identical toward their peripheries, there is no portion which gets partially dark. Also, there are the same advantages as those of the first aspect of the present invention.

According to the sixth aspect of the present invention, since there is further provided optical path conversion means on at least one of a surface opposed to the transparent substrate and its opposite surface, the light is allowed to enter the interior of the transparent substrate with high efficiency. Also, there are the same advantages as those of the first aspect of the present invention.

According to the seventh to tenth aspects of the present invention, since specific structures are provided as the optical path conversion means, the present invention can be surely employed.

According to the eleventh aspect of the present invention, since the optical path conversion means is formed so that the area density of the light scattering portion increases more as the optical path conversion means is far from the dot-shaped light source, the amount of reflection of light depends on a distance from the dot-shaped light source, thereby to make possible to make the light emitted from one surface of the light conductor opposite to the transparent substrate uniform. As a result, the light entering the interior of the transparent substrate gets linearly uniform, the light sources function in the same manner as that of the conventional fluorescent tube. Also, there are the same advantages as those of the first aspect of the present invention.

According to the twelfth aspect of the present invention, since there is further provided a light reflection member which covers all of a peripheral surface of said light conductor except for a portion opposite to the transparent substrate or a portion where said optical path conversion means is formed, the light is allowed to enter the interior of the transparent substrate with high efficiency. Also, there are the same advantages as those of the first aspect of the present invention.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A side light type spread illuminating apparatus in which at least a linear light source is disposed in the vicinity of a side surface of a transparent substrate, wherein the linear light source comprises:

a dot shaped light source; and an optical path conversion means comprising a light conductor connected integrally with the transparent substrate interposing a groove between the light conductor and the transparent substrate, the optical path conversion means including an optical path conversion portion comprising a light scattering portion, the optical path conversion portion being formed so that an area density of the light scattering portion increases in proportion to the distance from the dot-shaped light source.

2. A side light spread illuminating apparatus as claimed in claim 1, wherein said optical path conversion means further comprises a light reflector which reflects the light emitted outward from the opposite surface of the light conductor toward the transparent substrate.

3. A spread illuminating apparatus as claimed in claim 1, wherein said light conductor comprises one optical path conversion portion at least on one of the opposing surface and the opposite surface to the transparent substrate.

4. A spread illuminating apparatus as claimed in claim 1, the spot-shaped light source is provided on at least one of ends of the light conductor.

5. A spread illuminating apparatus as claimed in claim 4, wherein said light reflector is made of a metal vapored film.

6. A spread illuminating apparatus as claimed in claim 1, wherein said optical path conversion means is structured by continuously forming the light scattering portion formed of a concave-convex portion.

7. A spread illuminating apparatus as claimed in claim 1, wherein a white or milky paint partially is coated on the light scattering portion.

8. A spread illuminating apparatus as claimed in claim 5, wherein the light scattering portion is obtained by continuously forming grooves and a plain portion.

9. A spread illuminating apparatus as claimed in claim 5, wherein the light scattering portion is obtained by continuously forming inclined surfaces which are substantially triangular in section.

10. A spread illuminating apparatus as claimed in claim 6, wherein a sectional area of the light conductor in section perpendicular to the longitudinal length of the light conductor is made small in proportion to the distance from the dot-shaped light source.

11. A spread illuminating apparatus as claimed in any one of claim 4, further comprising a light reflector which covers all of a peripheral surface of said light conductor except for a surface opposing to the transparent substrate.

12. A spread illuminating apparatus as claimed in claim 1, said light conductor is configured as circular or non-circular in section perpendicular to the longitudinal direction.

13. A side light type spread illuminating apparatus in which a linear light source is disposed in the vicinity of a side surface of a transparent substrate, wherein the linear light source comprises: an optical path conversion means comprising a dot-shaped light source and a light reflector configured as a saw teeth in section.

* * * * *